United States Patent [19]

Shimizu et al.

[11] 4,374,890

[45] Feb. 22, 1983

[54] ADHESIVE-SHEET FOR THE REINFORCEMENT OF METAL PLATES AND METHOD OF REINFORCING METAL PLATES

[75] Inventors: Masato Shimizu; Eishi Asoshina; Takashi Tominaga; Tadahiro Muguruma, all of Ibaraki, Japan

[73] Assignee: Nitto Electric Industrial Co., Ltd., Osaka, Japan

[21] Appl. No.: 324,939

[22] Filed: Nov. 25, 1981

[30] Foreign Application Priority Data

Nov. 27, 1980 [JP] Japan ................................ 55-167428

[51] Int. Cl.$^3$ .......................... B32B 7/02; B05D 3/02; B32B 27/38; C09J 7/02
[52] U.S. Cl. .................................. 428/212; 427/207.1; 427/208.2; 427/372.2; 427/386; 427/388.1; 428/343; 428/344; 428/349; 428/354; 428/355; 428/413; 428/457
[58] Field of Search .............. 428/413, 212, 457, 344, 428/343, 349, 355; 427/372.2, 386, 388.1, 207.1, 208.2

[56] References Cited

U.S. PATENT DOCUMENTS 4,158,713  6/1979  Degens ............................ 428/212
4,343,843  8/1982  Johnson et al. ................ 428/413 X

*Primary Examiner*—Thomas J. Herbert, Jr.
*Attorney, Agent, or Firm*—Sughrue, Mion, Zinn, Macpeak and Seas

[57] ABSTRACT

An adhesive-sheet for the reinforcement of metal plate, and a method of reinforcing metal plates using an adhesive-sheet, are described. The adhesive-sheet comprises a first epoxy resin composition layer and a second epoxy resin composition layer laminated thereon wherein the first epoxy resin composition layer, when cured by heating, has a modulus of elasticity in tension sufficient to increase the stiffness of the metal plate, whereas the second epoxy resin composition layer, when cured by heating, has a modulus of elasticity in tension insufficient to increase the stiffness of the metal plate.

15 Claims, No Drawings

ADHESIVE-SHEET FOR THE REINFORCEMENT OF METAL PLATES AND METHOD OF REINFORCING METAL PLATES

FIELD OF THE INVENTION

The present invention relates to adhesive-sheet for the reinforcement of metal plates and a method of reinforcing metal plates by the use of the adhesive-sheets.

BACKGROUND OF THE INVENTION

Heretofore, in the production of vehicles such as cars, etc., reinforcement has been applied to steel plates for use in the production of the body thereof, for example, outer plates having a relatively large surface area, a flat form, and a small thickness, such as a roof, a fender, a hood, a trunk, a quarter panel, and a door, to provide increased strength, since it is necessary for them to have appropriate stiffness against forces on the outside surfaces thereof. This reinforcement has usually been accomplished by bonding inner plates comprising metallic reinforcements to the steel plates by spot welding or by the use of adhesives. This method, however, has disadvantages, in that the weight of the inner plates is relatively large, increasing the total weight of the body and production costs, and additional complicated steps for applying the inner plates are necessary.

It is also known that polymeric materials, such as asphalt rubber, epoxy resins, acrylic resins, phenol resins, and unsaturated polyester resins, can be coated on the back of such plates in a fairly large thickness and over a fairly broad surface to achieve both the purposes of prevention by vibration and enhancement of the strength of the plates. This method offers advantages in that relatively large reinforcing effects can be obtained by selecting polymeric materials having high modulus of elasticity in tension and adhesive force, and coating such polymeric materials in an appropriately large thickness. Therefore, this method is advantageous over the method using metallic reinforcements with respect to the weight and ease of operation.

Almost all polymeric materials having high modulus of elasticity in tension and adhesive force used according to the above method are thermosetting resins which are generally subjected to three-dimensional cross-linking. The use of such thermosetting resins, however, gives rise to the crucial problem that the residual stress resulting from shrinkage of the thermosetting resin after the hardening thereof produces undesirable strain (and resulting depressions) in the outer plate, deteriorating the surface evenness of the body, and therefore significantly deteriorating the product value.

It has therefore been desired to develop a novel and useful method for the reinforcement of metal plates, which uses thermosetting resins, thus offering advantages over metallic reinforcements, and which also permits obtaining sufficiently great reinforcing effects while preventing the formation of strain (and resulting depressions) in the metal plate, resulting from the shrinkage of the thermosetting resin after the hardening thereof.

SUMMARY OF THE INVENTION

In accordance with the present invention, there is provided:

(1) an adhesive-sheet for the reinforcement of metal plate, comprising a first epoxy resin composition layer and a second epoxy resin composition layer laminated thereon wherein the first epoxy resin composition is prepared so that when provided on the metal plate and cured by heating, it has modulus of elasticity in tension sufficient to increase the stiffness of the metal plate, and the second epoxy resin composition is prepared so that when provided on and adhered to the metal plate and cured by heating, it has modulus elasticity in tension insufficient to increase the stiffness of the metal plate; and (2) a method of reinforcing a metal plate comprising applying an adhesive-sheet as described in (1) above on the metal plate in such a manner that the second epoxy resin composition layer comes into contact with the metal plate, and curing the adhesive-sheet by heating.

DETAILED DESCRIPTION OF THE INVENTION

In general, the modulus of elasticity in tension of an epoxy resin composition after the curing thereof varies greatly depending on the type and amount of the epoxy resin, hardener, and other components used.

When an epoxy resin composition is prepared so that when provided directly on metal plates, such as body plates of automobiles, and cured by heating, it has modulus of elasticity in tension sufficient to increase the stiffness of the metal plate, and it is used to reinforce the metal plate, the above-described problem of formation of strain in the metal plate, resulting from the shrinkage of the epoxy resin, inevitably occurs, even though satisfactory reinforcing effects can be obtained.

On the other hand, when an epoxy resin composition is prepared so as to have modulus of elasticity in tension insufficient to increase the stiffness of the metal plate, and it is used to reinforce the metal plate, it has been found that the problem of formation of strain or depression in the metal plate substantially does not occur, but the object of reinforcement of the metal plate cannot be attained.

According to this invention, it has been found that when the epoxy resin composition having low modulus of elasticity in tension is laminated on the epoxy resin composition having high modulus of elasticity in tension, and the laminate is applied onto the metal plate in such a manner that the former epoxy resin composition comes into contact with the metal plate and is cured by heating, the desired reinforcing effects can be obtained, while preventing the formation of strain (and depressions) in the metal plate after the curing, and furthermore that the reinforcing effects obtained using such epoxy resin composition laminates are greater than those obtained using only the epoxy resin composition layer having high modulus of elasticity in tension.

The first epoxy resin composition layer, as used herein, when cured by heating, has a modulus of elasticity in tension sufficient to increase the stiffness of metal plates. In general, the modulus of elasticity in tension sufficient for that purpose is about 30 to 500 kg/mm$^2$. If the modulus of elasticity in tension is too high, the formation of strain or depression in the metal plate may not be prevented irrespective of the presence of the second epoxy resin composition.

The term "modulus of elasticity in tension" is used herein to refer to a value as determined by the method defined in ISO (International Organization for Standardization) Recommendation R-527, using a test piece of Type 1 and at a speed of Speed B (1966).

The second epoxy resin composition layer as used herein, when cured by heating, has a modulus of elasticity in tension insufficient to increase the stiffness of the metal plates. In general, the modulus of elasticity in tension insufficient to increase the stiffness is about 0.1 to 22 kg/mm$^2$ and preferably about 0.1 to 15 kg/mm$^2$. If the modulus of elasticity in tension is too low, the effect of reinforcing metal plates becomes poor.

The modulus of elasticity in tension of the first and second epoxy resin composition layers used herein is that of the epoxy resin composition containing no reinforcements described hereinafter.

The use of a combination of first and second epoxy resin composition layers having the moduli of elasticity in tension falling within the above-described ranges is suitable particularly for steel plates having a thickness of from 0.3 to 1.5 mm, preferably 0.5 to 1.0 mm.

The first and second epoxy resin composition layers are each prepared by adding a heat-activated hardener and if necessary, various additives to an epoxy resin, and molding the resulting mixture into a sheet in uncured or semi-cured state by the usual procedure. By determining appropriately the type and amount of each of the epoxy resin, heat-activated hardener, and additives, the modulus of elasticity in tension of each epoxy resin composition layer can be controlled within the above-described range, and the selection of the type and amount is obvious to one skilled artisan in the art.

Epoxy resins which can be used for the preparation of each epoxy resin composition layer include glycidyl ether type, glycidyl ester type, glycidyl amine type, linear aliphatic epoxide type, and alicyclic epoxide type epoxy resins. These epoxy resins can be used alone or in combination with each other depending on the desired physical properties of the epoxy resin composition layer.

Heat-activated hardeners that can be used include known hardeners exhibiting curing action upon heating. In general, they are sufficient if active within the temperature range of from 80° C. to 200° C. Examples of such heat-activated hardeners include dicyandiamide, 4,4'-diaminodiphenylsulfone, imidazoles, e.g., 2-n-heptadecylimidazole, isophthalic acid dihydrazide, N,N'-dialkylureas, and N,N-dialkylthioureas. The amount of the heat-activated hardener used is usually from 1 to 15 parts by weight per 100 parts by weight of the epoxy resin.

Various additives can be added to the above epoxy resin and heat-activated hardener, if necessary, for the purpose of providing the epoxy resin composition with cohesive force to such an extent as to permit the molding of a sheet, preventing sag, and of lowering the melt viscosity and increasing the wetting properties.

For example, for the purpose of increasing the sheet-forming ability, thermoplastic resins, such as polyvinyl butyral, polyamides, polyesters, polysulfones, polyketones, and high molecular weight epoxy resins derived from bisphenol A and epichlorohydrin, and butadiene-acrylonitrile copolymers can be added. The amount of the additive used is preferably from about 5 to 100 parts by weight per 100 parts by weight of the epoxy resin.

For the purpose of preventing sag of the epoxy resin composition, fillers such as calcium carbonate, talc, asbestos, silicates, carbon black, and colloidal silica are used. The amount of the filler used is usually from about 10 to 300 parts by weight per 100 parts by weight of the epoxy resin.

Also, for the purpose of lowering the melt viscosity and increasing the wetting properties, reactive diluents, such as butyl glycidyl ether and monoglycidyl ethers of long chain alcohols, phthalic acid-based plasticizers, such as dioctyl phthalate, and phosphoric acid-based plasticizers, such as trichlene diphosphate, can be added. The amount of the additive used is usually from about 5 to 30 parts by weight per 100 parts by weight of the epoxy resin.

Of the thus prepared first and second epoxy resin composition layers, the second epoxy resin composition layer, in particular, desirably exhibits adhesion in the ordinary state, since the adhesion makes easy preliminary adhesion of the second epoxy resin composition layer to the metal plate prior to the curing by heating. Of course, the first epoxy resin composition layer may have adhesive properties similarly.

In order to increase the metal plate-reinforcing effect, reinforcements can be embedded in the first epoxy resin composition layer. Reinforcements which can be used for this purpose include inorganic fabrics comprising glass fibers, asbestos fibers, or the like, organic fabrics comprising flax, cotton, nylon, polyester, polypropylene, or the like, plastic films, such as a polyester film and a nylon film, paper, such as craft paper, unwoven fabrics in a form of, for example, mat (particularly, chopped strand mat) comprising glass fibers, polyester fibers, polypropylene fibers, or the like, and foils made of metals such as aluminum, iron, copper, and zinc.

These reinforcements are embedded in the first epoxy resin composition layer by coating or impregnating one or both surfaces of each reinforcement with the epoxy resin composition in molding the first epoxy resin composition layer. By such manners, the whole or a portion of the reinforcements is embedded in the first epoxy resin composition layer.

Of the above-described reinforcements, inorganic fabrics are preferred since they provide sufficiently large reinforcing effects even though only one surface thereof is impregnated with the epoxy resin composition. In particular, it is preferred to use glass fiber fabrics in a form of cloth or mat having a weight of from 10 to 800 g/m$^2$.

The adhesive-sheet of the invention is prepared by laminating the first and second epoxy resin composition layers to each other. This lamination may be performed by utilizing their adhesive properties, or melt-bonding together by heating to an extent such that the epoxy resin compositions are not cured completely.

Although the thickness of the adhesive sheet varies depending on the type of the metal plate and the degree of reinforcement, the thickness of the first epoxy resin composition layer is typically from about 0.01 to 10 mm, and preferably from about 0.1 to 5 mm; the thickness of the second epoxy resin composition layer is typically from about 0.1 to 30 mm, and preferably from about 0.5 to 10 mm; thus, the total thickness of the adhesive sheet is typically from about 0.2 to 40 mm, and preferably from about 0.5 to 20 mm.

Typical examples of metal plates which are to be reinforced by the use of the adhesive sheet of the invention are steel plates such as outer plates of cars, aluminum plates, copper plates, and the like. In addition, the adhesive sheet of the invention can be applied to metal plates of vehicles, electric appliances, such as washing machines and television sets, and so on, which are generally used in a thin plate form.

Thus, the method of reinforcing metal plates according to the invention comprises applying the above-described adhesive sheet of the invention onto a metal plate as described above, for example, in the case of body steel plates, onto the back surface thereof, in such a manner that the second epoxy resin composition layer is in contact with the steel plate, bonding together by application of pressure, and curing the adhesive sheet by a conventional heating method, for example, by the use of a hot air circulation type heating oven, an infrared ray heating oven, a dielectric heating oven, and so forth. The heat-curing may be performed simultaneously at the paint-baking step of body steel plates in the car-production line.

In the reinforcing method of the invention, the use of the adhesive sheet comprising the first and second epoxy resin composition layers wherein the first epoxy resin composition layer has a reinforcement embedded therein and the second epoxy resin composition layer has adhesive properties permits obtaining the above-described characteristics.

In the case of adhesive-sheets with no reinforcements embedded therein, the reinforcing effect thereof can be increased as follows:

The adhesive-sheet of the invention is first applied onto a metal plate in such a manner that the second epoxy resin composition layer comes into contact with the metal plate, and then a reinforcement is introduced into the first epoxy resin composition layer. Thereafter, the reinforcement and adhesive-sheet are bonded together onto the metal plate by application of pressure, and cured by heating. In accordance with this method, the reinforcing effect can be increased to the extent that can be obtained by the use of the adhesive-sheet in which the reinforcement is previously embedded in the first epoxy resin composition layer. The same reinforcement as described hereinbefore can be used in this method, and in particular, glass fiber fabrics are preferably used.

Some of the major advantages of the invention are as follows:

(1) Great reinforcing effects can be obtained without the formation of strain and depressions in metal plates to be reinforced after the operation of reinforcement (e.g., heating).

(2) The operation of reinforcement is very convenient.

(3) The adhesive-sheet of the invention has flexibility such that even when the sheet is folded (i.e., 180° bending), no cracks occur in the bending portion, since epoxy resin composition layers constituting the adhesive-sheet are in uncured or semi-cured state prior to the application thereof onto metal plates. Therefore, the adhesive-sheet can be applied for the reinforcement of curved metal plates and metal plates having irregular surfaces.

The following examples are provided to illustrate the invention in greater detail. All parts are by weight.

EXAMPLE 1

35 parts of Epikote #828 (Bisphenol A-type liquid epoxy resin produced by Yuka Shell Co., Ltd.), 50 parts of Epikote #1002 (Bisphenol A-type solid epoxy resin produced by Yuka Shell Co., Ltd.), 15 parts of Bailon #500 (polyester resin produced by Toyobo Co., Ltd.), 5 parts of Curezole 2MZ-AZINE (latent curing agent for epoxy resins, produced by Shikoku Chemical Co., Ltd.), 5 parts of dicyandiamide (latent curing agent for epoxy resins, produced by Nippon Carbide Co., Ltd.), 50 parts of talc, and 2 parts of asbestos powder were mixed and kneaded by the use of conventional mixing rolls. The thus obtained resin mass was molded into a sheet by the use of a direct hydraulic molding press to prepare a 0.4 mm thick first epoxy resin composition layer which was in an uncured state.

An epoxy resin mixture comprising 80 parts of Epikote #871 (dimer acid-modified epoxy resin produced by Yuka Shell Co., Ltd.), 10 parts of Epikote #1002, and 10 parts of Hycar CTBN 1300×8 (nitrile rubber produced by B.F. Goodrich Co.) was dissolved in 200 parts of methyl ethyl ketone in a still, transferred to a vat, and vacuum-dried in a vacuum drier to prepare a viscous composition having no methyl ethyl ketone odor. To 100 parts of the viscous composition were added 5 parts of Curezole 2MZ-AZINE, 5 parts of dicyandiamide, 50 parts of talc, and 2 parts of asbestos powder. The mixture was kneaded by the use of the conventional mixing rolls. The thus prepared resin mass was molded into a sheet by the use of the direct-hydraulic molding press to prepare a 1 mm thick second epoxy resin composition layer which was in an uncured state.

The first and second epoxy resin composition layers were bonded together to prepare an adhesive-sheet for the reinforcement of metal plates according to the invention.

The moduli of elasticity in tension of the first and second epoxy resin composition layers which had been cured by heating at 150° C. for 60 minutes were 97 kg/mm$^2$ and 3.0 kg/mm$^2$, respectively.

EXAMPLE 2

50 parts of Epikote #828, 50 parts of Epikote #1002, 10 parts of Hycar #1072 (carboxyl group-containing nitrile rubber produced by B.F. Goodrich Co.), 40 parts of Platamide H103P (nylon copolymer resin produced by Nippon Rilsan Co., Ltd.), 5 parts of D. P. Hardener (curing agent produced by Maruwa Biochemical Co., Ltd.), 5 parts of dicyandiamide, 50 parts of talc, and 2 parts of asbestos powder were mixed and kneaded by the use of a conventional mixing rolls. The thus obtained resin mass was molded into a sheet by the use of a direct-hydraulic molding press to prepare a 0.3 mm thick first epoxy resin composition layer which was in an uncured state.

An epoxy resin mixture comprising 75 parts of Adeka EP-4000 (epoxy resin produced by Asahi Denka Kogyo K.K.), 15 parts of Epikote #1002, and 10 parts of Hycar #1001 was dissolved in 200 parts of methyl ethyl ketone in a still, transferred to a vat, and vacuum-dried to prepare a viscous composition having no methyl ethyl ketone odor. To 100 parts of the viscous composition were added 5 parts of D. P. Hardener, 5 parts of dicyandiamide, 50 parts of talc, and 2 parts of asbestos powder, and the resulting mixture was kneaded by the use of a conventional mixing roll. The thus prepared resin mass was molded into a sheet by the use of the direct-hydraulic molding press to prepare a 0.7 mm thick second epoxy resin composition layer which was in an uncured state.

The first and second epoxy resin composition layers were bonded together to prepare an adhesive-sheet of the invention. The first and second epoxy resin composition layers which had been cured at 150° C. for 60 minutes had a modulus of elasticity in tension of, respectively, 72 kg/mm² and 10 kg/mm².

EXAMPLE 3

35 parts of Epikote #828, 30 parts of Epikote #1002, 35 parts of Hycar CTBN 1300×8 (carboxyl group-containing liquid nitrile rubber produced by G.F. Goodrich Co.), 5 parts of D. P. Hardener, 5 parts of dicyandiamide, 50 parts of talc, and 2 parts of asbestos powder were mixed and kneaded by the use of a conventional mixing roll. The thus obtained resin mass was molded into a sheet by the use of the direct-hydraulic molding press to prepare a 0.5 mm thick first epoxy resin composition layer which was in an uncured state.

The first epoxy resin composition layer, and the second epoxy resin composition layer prepared in Example 2 were bonded together to prepare an adhesive-sheet of the invention. The modulus of elasticity in tension of the first epoxy resin composition layer which had been cured at 150° C. for 60 minutes was 33 kg/mm².

EXAMPLE 4

The adhesive-sheet prepared in Example 1 was bonded to a 0.7 mm thick steel plate in such a manner that the second epoxy resin composition layer came into contact with the steel plate, and firmly adhered thereto by heat-curing at 150° C. for 60 minutes. After the heat-curing, the formation of sink marks (i.e., depressions) in the steel plate was not observable with the naked eye.

The thus reinforced steel plate was subjected to the following strength test.

Strength Test

A test piece (width, 50 mm) was supported horizontally on two vertical plates (width, 50 mm) having an inverted U shaped top (curvature radius, 5 mm), which were placed in parallel with each other with a distance between the tops of 100 mm apart, and a vertical plate (width, 50 mm) having a U shaped top (curvature radius, 10 mm) was centrally placed on the opposite side of the test piece to apply pressure. In this way, the maximum bending stress (kg/50 mm width) was measured.

The above reinforced steel plate had a maximum bending stress of 18 kg/50 mm width, whereas the maximum bending stress of the steel plate per se which had not been reinforced at all was 8 kg/50 mm width. Thus, it can be seen that the adhesive-sheet of the invention has excellent reinforcing effects.

COMPARATIVE EXAMPLE 1

Only the first epoxy resin composition layer prepared as in Example 1 was provided on a 0.7 mm thick steel plate and cured by heating to reinforce the steel plate. The thus reinforced steel plate had a maximum bending stress of 15 kg/50 mm width as determined in the same manner as in Example 4. Thus, it can be seen that the reinforcing effect of the first epoxy resin composition layer per se is somewhat useful. However, the formation of sink marks in the steel plate was observable with the naked eye after the heat-curing operation.

COMPARATIVE EXAMPLE 2

Only the second epoxy resin composition layer prepared in Example 2 was provided on a 0.7 mm thick steel plate and cured by heating to reinforce the steel plate. The thus reinforced steel plate had a maximum bending stress of 12 kg/50 mm width as determined in the same manner as in Example 4. Thus, it can be seen that the reinforcing effect of the second epoxy resin composition layer per se is poor, even though the formation of sink marks in the steel plate was not observable after the heat-curing operation.

EXAMPLE 5

The adhesive-sheet prepared in Example 1 was bonded to a 0.7 mm thick steel plate in such a manner that the second epoxy resin composition layer came into contact with the steel plate and, thereafter, a glass cloth (WE-22D-104 BV produced by Nitto Boseki K.K.) was pressed to the first epoxy resin composition layer. They were cured into a unitary body by heating at 150° C. for 60 minutes. After the heat-curing operation, the formation of sink marks in the steel plate was not observed, and the reinforced steel plate has a maximum bending stress of 40 kg/50 mm width. Thus, it can be seen that the reinforcing effect is greater than that in Example 4.

EXAMPLE 6

Using the adhesive-sheet prepared in Example 2, a 0.7 mm thick steel plate was reinforced in the same manner as in Example 4. After the heat-curing operation, the formation of sink marks in the steel plate was not observed. The reinforced steel plate had a maximum bending stress of 14.5 kg/50 mm width. Thus, it can be seen that the reinforcing effect is significant.

EXAMPLE 7

Using the adhesive-sheet prepared in Example 3, a 0.7 mm thick steel plate was reinforced in the same manner as in Example 4. After the heat-curing operation, the formation of sink marks in the steel plate was not observed. The reinforced steel plate had a maximum bending stress of 15 kg/50 mm width. Thus, it can be seen that the reinforcing effect is significant.

EXAMPLE 8

Using the adhesive-sheet prepared in Example 2, a glass mat (MC #300 produced by Nitto Boseki K.K.) was pressed to the first epoxy resin composition layer, and the adhesive-sheet having the glass mat was bonded to a 0.7 mm thick steel plate in such a manner that the second epoxy resin composition layer came into contact with the steel plate. They were cured into a unitary body by heating at 150° C. for 60 minutes. After the heat-curing operation, the formation of sink marks in the steel plate was not observed, and the reinforced steel plate had a maximum bending stress of 36 kg/50 mm width. Thus, it can be seen that the reinforcing effect is greater than that in Example 6.

While the invention has been described in detail and with reference to specific embodiment thereof, it will be apparent to one skilled in the art that various changes and modifications can be made therein without departing from the spirit and scope thereof.

What is claimed is:

1. An adhesive-sheet for the reinforcement of metal plate, comprising a first epoxy resin composition layer and a second epoxy resin composition layer laminated thereon wherein the first epoxy resin composition layer is prepared so that when provided on the metal plate and cured by heating, it has a modulus of elasticity in tension sufficient to increase the stiffness of the metal plate, and the second epoxy resin composition layer is prepared so that when provided on and adhered to the metal plate and cured by heating, it has a modulus of elasticity in tension insufficient to increase the stiffness of the metal plate.

2. The adhesive-sheet as in claim 1, wherein the modulus of elasticity in tension of the heat-cured first epoxy resin composition layer is from 30 to 500 kg/mm$^2$, and the modulus of elasticity in tension of the heat-cured second epoxy resin composition layer is from 0.1 to 22 kg/mm$^2$.

3. The adhesive-sheet as in claim 1 or 2, wherein the thickness of said first epoxy resin composition layer is from 0.01 to 10 mm, and the thickness of the second epoxy resin composition layer is from 0.1 to 30 mm.

4. The adhesive-sheet as in claim 1 or 2, wherein a reinforcement is embedded in the first epoxy resin composition layer.

5. The adhesive sheet as in claim 4, wherein the reinforcement is a glass fiber.

6. The adhesive-sheet as in claim 1 or 2, wherein at least the second epoxy resin composition layer has adhesive properties.

7. The adhesive-sheet as in claim 1 or 2, wherein the metal plate is a body steel plate of a vehicle.

8. A method for reinforcing a metal plate comprising applying thereto an adhesive-sheet comprising a first epoxy resin composition layer and a second epoxy resin composition layer laminated thereon, wherein the first epoxy resin composition layer is prepared so that when provided on the metal plate and cured by heating, it has a modulus of elasticity in tension sufficient to increase the stiffness of the metal plate, and the second epoxy resin composition layer is prepared so that when provided on the metal plate and cured by heating, it has a modulus of elasticity in tension insufficient to increase the stiffness of the metal plate, in such a manner that the second epoxy resin composition layer comes into contact with the metal plate, and, thereafter, curing the adhesive sheet by heating.

9. The method as in claim 8, wherein the modulus of elasticity in tension of the heat-cured first epoxy resin composition layer is 30 to 500 kg/mm$^2$ and the modulus of elasticity in tension of the heat-cured second epoxy resin composition layer is 0.1 to 22 kg/mm$^2$.

10. The method as in claim 8 or 9, wherein the thickness of the first epoxy resin composition layer is from 0.01 to 10 mm, and the thickness of the second epoxy resin composition layer is from 0.1 to 30 mm.

11. The method as in claim 8 or 9, wherein at least the second epoxy resin composition layer has adhesive properties.

12. The method as in claim 8 or 9, wherein a reinforcement is embedded in the first epoxy resin composition layer.

13. The method as in claim 8 or 9, wherein a reinforcement is embedded in the first epoxy resin composition layer, and the reinforcement and the adhesive-sheet are applied as a unitary material onto the metal plate and cured by heating.

14. The method as in claim 12, wherein the reinforcement is a glass fiber.

15. The method as in claim 8 or 9, wherein the metal plate is a steel plate forming part of the body of a vehicle, and the adhesive-sheet is applied to the back surface of the steel plate and cured by heating.

* * * * *